Dec. 20, 1966 R. G. BENNETT ETAL 3,293,431
FLUORESCENT TRACER TECHNIQUE FOR DETECTING
DEFECTS IN AIR PERMEABLE BODIES
Filed Dec. 26, 1963
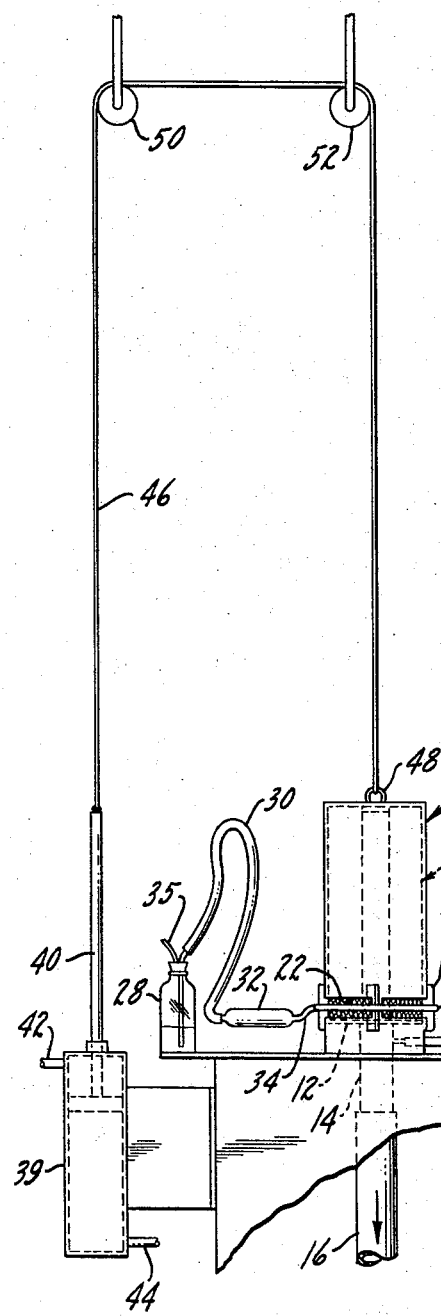
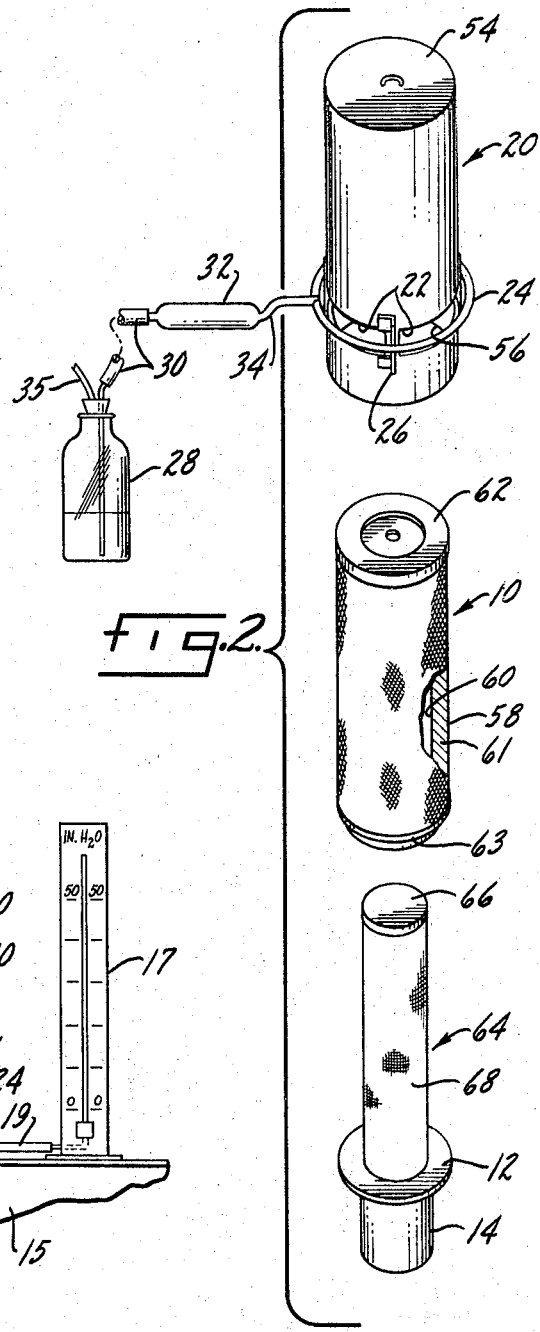
INVENTORS
RAYMOND G. BENNETT
WILLIS H. RISSE
BY Parker & Carter
Attorneys.

3,293,431
FLUORESCENT TRACER TECHNIQUE FOR DETECTING DEFECTS IN AIR PERMEABLE BODIES
Raymond G. Bennett, Olympia Fields, and Willis H. Risse, Flossmoor, Ill., assignors to Novo Industrial Corporation, New York, N.Y., a corporation of New York
Filed Dec. 26, 1963, Ser. No. 333,551
7 Claims. (Cl. 250—71)

This invention relates to an apparatus for detecting defects in body sections, and particularly relates to a method for detecting defects in air permeable body sections such as air filter elements.

The primary object of this invention is a method whereby defects in body sections such as air filter elements can be detected with practical certainty.

Another object is a method whereby the general dimensions and positions of defects in body sections such as air filter elements can be detected both quickly and certainly.

Another object is a method and apparatus where defects may be detected in air permeable body sections without damaging or otherwise making such body sections unusable.

Another object is a method and apparatus to improve manufacturing of air permeable body sections by detecting the general position and dimension of defects which may have occurred in the manufacturing process.

Another object is a method and apparatus in which defects in an air permeable body section may be detected by moving a fluorescent agent through any such defects by an air flow created by pressure differential between different faces of the body section.

These and other objects are achieved by the invention which will be disclosed in the specification and drawings wherein:

FIGURE 1 is a diagrammatic side view of an apparatus to practice the method; and FIGURE 2 is an exploded perspective showing the grid, filter element and shroud element.

The diagrammatic view of FIGURE 1 shows an air permeable body section such as an air filter element 10 set up to be scanned for any defects such as tears, cuts or other holes. The element rests on a ring or flange 12 which may be fixed to pipe or conduit 14 seated in a flow bench 15. Another conduit 16 connects pipe 14 to a pressure reducing means such as a fan (not shown). This will cause air to flow down conduits 14, 16 and thereby reduce pressure on one side of the air filter element.

The air filter element is shown covered by an enclosure or shroud 20. A plurality of windows or scanning slots are distributed around the perimeter of the shroud and such windows expose reduced areas of the air filter element. A manometer 17 is shown joined to pipe 14 by connection 19 so that the reduced pressure within the air filter element may be measured and maintained within desired limits.

A spray nozzle 24 is positioned adjacent the windows 22 and such spray nozzle is fixed to the shroud by brackets or the like 26. This spray nozzle is shown as a ring encircling the scanning slots in the shroud. A plurality of fine apertures (not shown) are distributed on the inside circumference of the ring for spraying fluorescent agent through the windows and onto the air filter element. The fluorescent agent is delivered from a supply 28 via an elongated flexible tube 30 to, if desired, a surge or reservoir tank 32. The reservoir 28 may be vented as at 35 or this may be a closed conduit leading to another source of fluorescent agent to equalize pressure between the sources. The fluorescent agent moves into a rigid tube 34 from where it enters the spray nozzle 24. The manometer, shroud and supply of fluorescent agent are shown in place on the flow bench 15 which houses the means for reducing pressure within the air filter element.

The shroud is adapted to be raised along with the spray nozzle so that substantially the entire area of the air filter element is exposed serially or successively to the windows. One means shown to raise the shroud includes a cylinder 39 from which a rod 40 of a piston projects. The piston may be actuated up and down in a controlled manner by means such as air or other fluid which leaves and enters through ports 42 and 44. A line 46 is tied at one end to the piston rod and at the other end to the shroud at 48. The line is positioned for raising and lowering the shroud by means such as pulleys 50 and 52.

Greater detail may be seen in FIGURE 2. The shroud 20 is seen as having a closed upper end 54 and an open bottom end 56. The scanning slots or windows 22 are shown around the perimeter at a lower part of the shroud. The spray nozzle 24 is shown adjacent to the scanning slots and its connection to the source of fluorescent agent is indicated. The shroud is adapted to move up and down over an air filter element or air permeable body section which has continuous side walls having an outside face 58 and an inside face 60. The faces may be wire grids enclosing fibers, paper or the like indicated at 61. Closure elements such as 62, 63 may be placed at the ends of the permeable body section. The bottom closure 63 has an opening (not shown) for a nozzle through which cylindrical detector grid 64 may be passed. The detector grid has an upper sealed end 66 and an air permeable continuous side wall 68 which may be of small mesh wire grid construction. The cylindrical grid may be fixed inside conduit 14 to provide a continuous passage by which pressure reduction is obtained. This grid provides a receiving surface for any fluorescent agent passing through the side wall of the air filter element. The bottom closure 63 of the air filter element is shaped to further provide a substantially air tight seal when seated on a ring or flange 12.

The use and operation of my invention are as follows:
The disclosed method and apparatus will detect flaws in air permeable body sections such as air filter elements quickly and certainly. The type of units which can be tested are those having air permeable body sections with an outside face and an inside face. It is provided that a pressure differential is developed between these faces by preferably reducing the pressure on the inside face relative to the air pressure on the outside face.

This has been shown with an air filter element by creating a partial vacuum inside the air filter element. The air filter element has then been shown as positioned around a detector grid which is also air permeable and which provides a surface for receiving the fluorescent agent. Air pressure is reduced within a cylindrical detector grid so that the air flows through the air filter element and the continuous grid surface. This air flow is selected within a controllable range for the particular body tested. The air flow should not be so great that fluorescent agent would be heavily deposited on the body section or pulled through the air permeable body section at places other than defects. Likewise, the air flow should be sufficiently high to carry the fluorescent agent as a fine spray through the air permeable body section and through any defects which might be in its side walls. For example, we have found that a pressure of about 50 inches of water is adequate to test air filter elements of the type used to clean air introduced to the carburetor of an automobile. A particular controlled pressure level may easily be ascertained by conventional steps.

It is required that substantially the entire outside face of the body section be scanned so that a deposit of fluorescent agent may be made on substantially the entire area of the outside face. This may be done by "scanning" serial or successive exposed areas on the outside face. We have shown that this step can be done by using a shroud or cover having scanned slots or windows 22 around its lower perimeter. When this shroud is raised at a controlled rate the spray nozzle fixed to the shroud will be raised with it and fine sprays of fluorescent agent will be deposited on the outside face to cover substantially the entire area during upward movement of the shroud. After the area of the body section or air filter element is substantially sprayed with the fluorescent agent and carried through any defects, the agent will be seen on the underlying surface of the detector grid. This fluorescent agent may be detected in different ways, depending on the agent used. Ordinarily, a small amount of traceable material will not be visible to the naked eye, but will provide a distinct trace under black light, which is a light of invisible radiant energy in the range of 3000–4000 Angstrom units. The fluorescent agent may be a liquid, a gas or a solid such as dry fluorescent powder. Agents which luminesce under black light and other exciting lights, such as cathode rays, are zinc sulfide phosphors and various silicates, borates, phosphates and tungstates. Lead activated calcium silicate has a peak emission at about 3400 A., and cerium activated calcium phosphate has a peak emission at about 3600 A. The detector grid is preferably shaped and dimensioned to correspond generally with the contours and dimensions of the side walls of the air filter element. Any traceable amount of fluorescent agent which passes through defects in the air filter element will thereby appear on the detector grid in the general position and shape which corresponds to the place and size of such defects on the air filter element. This may help the practitioners to pinpoint places in the manufacturing process where such defects might arise. They may also wish to patch up the air filter elements at such parts and thereby not suffer complete economic loss as by discarding the unit.

We have shown a method and apparatus for detecting faults in air permeable body sections having continuous side walls such as air filter elements, but the body sections need not necessarily be restricted to such forms. We have referred to inside and outside faces of such body sections but this could well mean opposite faces and the like. The faces may be smooth, convoluted or have other conformations. It is only required that a pressure differential be created between these faces so air flow is generated through the body section, and it is only required that a receiving surface be positioned adjacent to one face to receive the fluorescent agent which passes through any defects in the body section. It is accordingly provided, therefore, that the receiving surface could be in shapes and forms other than the cylindrical one shown. Likewise, other means may be devised for depositing the fluorescent agent through the outside face of the body section besides using scanning slots or open windows in a shroud. An open window is a preferred form because it is a controlled way of depositing the fluorescent agent on substantially the entire surface of the outside face, but other means may be devised, for example, using a spiral nozzle spray around the body section.

The foregoing invention can now be practiced, and practitioners will know that the invention is not necessarily restricted to the particular embodiments presented herein. The scope of the invention is to be defined by the terms of the following claims as given meaning by the preceding description.

We claim:

1. A method to detect flaws in an air permeable body section with opposed faces, which includes the steps of creating a pressure differential between the outside and inside faces so air flows through the air permeable body section, serially exposing contiguous reduced areas in said outside face to substantially scan the entire face, carrying a fluorescent agent to such outside exposed face by the air flow through the body section, passing the fluorescent agent through defects in the body section, part of the faces and onto an adjacent surface, and detecting the fluorescent agent on said adjacent surface.

2. A method as in claim 1 further characterized in that the adjacent surface has substantially the same dimensions as the air permeable body section so that the detected fluorescent agent on the surface corresponds substantially to the defect in the body section.

3. A method as in claim 1 further characterized in that the fluorescent agent is carried to the exposed areas as a fine spray by reducing the pressure in the inside face relative to the pressure on the outside face so that the resulting air flow pulls said fluorescent agent through any defects but not substantially through undamaged portions of said air permeable body section.

4. An apparatus to detect flaws in air permeable body sections with inside and outside faces which includes, in combination, means to create a pressure differential between the outside and inside faces to cause air flow through the body section, a shroud covering substantially the entire outside face of the body section, means in the shroud to serially expose reduced areas of the outside face until substantially the entire face is scanned by such exposure, means to deliver a fluorescent agent adjacent such exposed areas, said fluorescent agent adapted to be carried to the exposed areas by the air flow through the body section, and a receiving surface adjacent the inside face of the body section to collect fluorescent agent which passes through defects in the body section.

5. An apparatus according to claim 4 further characterized in that the shroud has scanning slots, and there are means to move the shroud so that the scanning slots serially expose areas on the outside face.

6. An apparatus as in claim 4 further characterized in that the inside and outside faces of the air permeable body section are continuous, and the surface adjacent the inside face is part of a grid detector body, said adjacent surface being continuous and substantially following the dimensions of the faces of the body section so that fluorescent agent detected on the surface corresponds substantially to the position and dimensions of the defects in the body section, and means connected to said grid detector body to create a reduced pressure in the inside face relative to the outside face so that the resulting air flow pulls said fluorescent agent through any defects but not substantially through undamaged portions of said body section.

7. An apparatus to detect flaws in air permeable body sections with continuous inside and outside faces which includes, in combination, a grid with a continuous surface positioned within the inside face of the body section, means joined to the grid to reduce the air pressure so that air flows through the body section and the grid, a movable shroud covering the body section, scanning slots in the shroud to expose reduced areas of the outside face are serially exposed, a supply of fluorescent agent, and a conduit leading from the supply to the window so that air flow through the body section moves the fluorescent agent to the body section and through any defects in the body section onto the grid, whereby the detected fluorescent agent on the grid surface substantially corresponds to the position and dimensions of any defects in the body section.

References Cited by the Examiner

UNITED STATES PATENTS

| | | | |
|---|---|---|---|
| 2,157,135 | 5/1939 | Little et al. | 73—38 |
| 2,259,400 | 10/1941 | Switzer | 250—71 |
| 2,844,735 | 7/1958 | Greutz et al. | 250—83.6 |
| 2,939,011 | 5/1960 | Bisso et al. | 250—83 |
| 2,999,162 | 9/1961 | Fearon | 250—83.6 |

FOREIGN PATENTS 303,512  4/1930  Great Britain.

WALTER STOLWEIN, *Primary Examiner.*

RALPH G. NILSON, *Examiner.*

S. ELBAUM, *Assistant Examiner.*